United States Patent
Ding et al.

(10) Patent No.: US 10,453,228 B2
(45) Date of Patent: Oct. 22, 2019

(54) DIFFERENCE VISUALIZATION BETWEEN DATA SETS

(71) Applicant: Microsoft Technology Licensing, LLC, Redmond, WA (US)

(72) Inventors: Bolin Ding, Redmond, WA (US); Chi Wang, Redmond, WA (US); Danyel A. Fisher, Seattle, WA (US); Robyn Dominik Moritz, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/453,795

(22) Filed: Mar. 8, 2017

(65) Prior Publication Data

US 2018/0260985 A1  Sep. 13, 2018

(51) Int. Cl.
*G06T 11/20* (2006.01)
*G06F 16/26* (2019.01)

(52) U.S. Cl.
CPC ............ *G06T 11/206* (2013.01); *G06F 16/26* (2019.01)

(58) Field of Classification Search
CPC ... G06T 11/206; G06F 17/30572; G06F 16/26
See application file for complete search history.

(56) References Cited

U.S. PATENT DOCUMENTS

| | | | |
|---|---|---|---|
| 6,468,218 B1 | 10/2002 | Chen et al. | |
| 6,812,926 B1 * | 11/2004 | Rugge | G06T 11/206 |
| | | | 283/115 |
| 7,233,843 B2 * | 6/2007 | Budhraja | H02J 3/008 |
| | | | 700/291 |
| 7,598,977 B2 | 10/2009 | Ryall et al. | |
| 8,060,259 B2 * | 11/2011 | Budhraja | H02J 3/008 |
| | | | 700/291 |
| 8,065,156 B2 * | 11/2011 | Gazdzinski | G06Q 30/0251 |
| | | | 704/275 |
| 8,290,778 B2 * | 10/2012 | Gazdzinski | G06Q 30/0251 |
| | | | 704/270 |

(Continued)

OTHER PUBLICATIONS

"Histogram to show current and last week data #1244", https://github.com/elastic/kibana/issues/1244, Published on: May 21, 2014, 8 pages.

(Continued)

*Primary Examiner* — Jeffery A Brier
(74) *Attorney, Agent, or Firm* — Schwegman Lundberg & Woessner, P.A.

(57) ABSTRACT

A visualization system suitable for visualizing differences between data sets is provided. The system determines a first data set and a second data set along with a difference between the first and second data set. A value corresponding to each unit of display of the second data set is plotted on at least one graph. The visualization system determines, for each unit of display of the second data set, whether the first data set has a value for the unit of display. In response to the first data set having the value, the visualization system plots a difference of the value of the first data set on the at least one graph. In response to the first data set not having the value, the visualization system plots a missing structure element on the at least one graph. The at least one graph is displayed to a user.

19 Claims, 8 Drawing Sheets

(56) References Cited

U.S. PATENT DOCUMENTS

| | | | | |
|---|---|---|---|---|
| 8,296,146 | B2* | 10/2012 | Gazdzinski | G06Q 30/0251 |
| | | | | 187/396 |
| 8,401,710 | B2* | 3/2013 | Budhraja | H02J 3/008 |
| | | | | 700/291 |
| 8,712,777 | B1* | 4/2014 | Gazdzinski | G06Q 30/0251 |
| | | | | 187/396 |
| 8,719,037 | B2* | 5/2014 | Gazdzinski | G06Q 30/0251 |
| | | | | 187/396 |
| 8,719,038 | B1* | 5/2014 | Gazdzinski | G06Q 30/0251 |
| | | | | 369/24.01 |
| 8,781,839 | B1* | 7/2014 | Gazdzinski | G06Q 30/0251 |
| | | | | 369/30.01 |
| 9,262,849 | B2 | 2/2016 | Fan et al. | |
| 9,405,651 | B1 | 8/2016 | Bailey | |
| 2007/0030287 | A1* | 2/2007 | Buran | G06F 17/18 |
| | | | | 345/629 |
| 2007/0150562 | A1* | 6/2007 | Stull | G06F 17/30286 |
| | | | | 709/223 |
| 2010/0169788 | A1 | 7/2010 | Khurana et al. | |
| 2013/0110797 | A1 | 5/2013 | Campbell et al. | |
| 2013/0265319 | A1 | 10/2013 | Fisher et al. | |
| 2013/0268520 | A1 | 10/2013 | Fisher et al. | |
| 2014/0358999 | A1 | 12/2014 | Rabinowitz et al. | |
| 2015/0269228 | A1 | 9/2015 | Fisher et al. | |
| 2016/0043465 | A1* | 2/2016 | McDevitt | H01Q 3/267 |
| | | | | 342/368 |
| 2016/0147880 | A1 | 5/2016 | Scheibli et al. | |
| 2016/0248644 | A1* | 8/2016 | Dontcheva | H04L 43/045 |

OTHER PUBLICATIONS

Park, et al., "Database Learning: Toward a Database that Becomes Smarter Every Time-", http://yongjoopark.com/resources/dbit-vldb17.pdf, Retrieved on: Dec. 14, 2016, 14 pages.

Fisher, et al., "Exploratory Visualization Involving Incremental, Approximate Database Queries and Uncertainty", In Proceedings of IEEE computer graphics and applications, Jul. 1, 2012, pp. 55-62.

"Histogram", http://web.archive.org/web/20150905164349/https://developers.google.com/chart/interactive/docs/gallery/histogram, Published on: Sep. 5, 2015, 49 pages.

Ioannidis, et al., "Histogram-Based Approximation of Set-Valued Query Answers", In Proceedings of the 25th VLDB Conference, vol. 99, Sep. 7, 1999, pp. 174-185.

North, et al., "DataWear: Revealing Trends of Dynamic Data in Visualizations", In Proceedings of IEEE Symposium on InfoVis, Oct. 11, 2001, 4 pages.

Yi, et al., "Understanding and characterizing insights: how do people gain insights using information visualization?", In Proceedings of the Workshop on beyond time and errors: novel Evaluation methods for Information Visualization, Apr. 5, 2008, pp. 1-6.

Agarwal, et al., "Knowing when you're Wrong: Building Fast and Reliable Approximate Query Processing Systems", In Proceedings of the ACM SIGMOD International Conference on Management of Data, Jun. 22, 2014, pp. 481-492.

Agarwal, et al., "BlinkDB: Queries with Bounded Errors and Bounded Response Times on Very Large Data", In Proceedings of the 8th ACM European Conference on Computer Systems, Apr. 15, 2013, pp. 29-42.

Bostock, et al., "D3 Data-Driven Documents", In Proceedings of IEEE Transactions on Visualization and Computer Graphics, vol. 17, Issue 12, Dec. 2011, 9 pages.

Budiu, et al., "Interacting with large distributed datasets using Sketch", In Proceedings of Eurographics Symposium on Parallel Graphics and Visualization, May 25, 2015, 13 pages.

Card, et al., "The information visualizer, an information workspace", In Proceedings of the SIGCHI Conference on Human Factors in Computing Systems, Apr. 27, 1991, 181-188 pages.

Chaudhuri, et al., "An Overview of Data Warehousing and OLAP Technology", In Journal of ACM SIGMOD Record, vol. 26, Issue 1, Mar. 1997, 10 pages.

Cumming, et al., "Inference by Eye: Confidence Intervals and How to Read Pictures of Data", In Journal of American Psychologist, vol. 60, No. 2, Feb. 2005, pp. 170-180.

Ding, et al., "Sample + Seek: Approximating Aggregates with Distribution Precision Guarantee", In Proceedings of the International Conference on Management of Data, Jun. 26, 2016, pp. 679-694.

Elmqvist, et al., "Hierarchical Aggregation for Information Visualization: Overview, Techniques, and Design Guidelines", In Journal of IEEE Transactions on Visualization and Computer Graphics, vol. 16, Issue 3, May 2010, pp. 439-454.

Fekete, et al., "Progressive Analytics: A Computation Paradigm for Exploratory Data Analysis", In Proceedings of Computer Research Repository, Jul. 2016, 10 pages.

Ferreira, et al., "Sample-oriented task-driven visualizations: Allowing users to make better, more confident decisions", In Proceedings of the SIGCHI Conference on Human Factors in Computing Systems, Apr. 26, 2014, pp. 571-580.

Fisher, Danyel, "Big Data Exploration Requires Collaboration between Visualization and Data Infrastructures", In Proceedings of the Workshop on Human-In-the-Loop Data Analytics, Jun. 26, 2016, 5 pages.

Fisher, et al., "Trust me, I'm partially right: incremental visualization lets analysts explore large datasets faster", In Proceedings of the SIGCHI Conference on Human Factors in Computing Systems, May 5, 2012, pp. 1673-1682.

Godfrey, et al., "Interactive Visualization of Large Data Sets", In Proceedings of IEEE Transactions on Knowledge and Data Engineering, vol. 28, No. 8, Aug. 2016, pp. 2142-2157.

Gray, et al. "Data cube: A relational aggregation operator generalizing group-by, cross-tab, and sub-totals", In Journal of Data Mining and Knowledge Discovery, vol. 1, Issue 1, Mar. 1997, 5 pages.

Heer, et al. "Graphical histories for visualization: Supporting analysis, communication, and evaluation", In IEEE transactions on visualization and computer graphics, vol. 14, Issue 6, Nov. 2008, pp. 1189-1196.

Hellerstein, et al., "Interactive Data Analysis: The Control Project", In Journal of Computer, vol. 32, Issue 8, Aug. 1999, pp. 51-59.

Hellerstein, et al., "Online aggregation", In Proceedings of the ACM SIGMOD Record, vol. 26, Issue 2, Jun. 1997, pp. 171-182.

Hullman, et al., "Hypotheical Outcome Plots Outperform Error Bars and Violin Plots for Inferences about Reliability of Variable Ordering", In PloS one, vol. 10, Issue 11, Nov. 16, 2015, 36 pages.

Joslyn, et al., "Decisions with uncertainty: the glass half full", In Journal of Current Directions in Psychological Science, vol. 22, Issue 4, Aug. 1, 2013, 3 pages.

Kamat, et al., "Distributed and interactive cube exploration", In Proceedings of IEEE 30th International Conference on Data Engineering, Mar. 31, 2014, 12 pages.

Lins, et al., "Nanocubes for real-time exploration of spatiotemporal datasets", In IEEE Transactions on Visualization and Computer Graphics, vol. 19, Issue 12, Dec. 2013, 10 pages.

Liu, et al., "The effects of interactive latency on exploratory visual analysis", In IEEE transactions on visualization and computer graphics, vol. 20, Issue 12, Dec. 2014, 10 pages.

Liu, et al., "imMens: Real-time Visual Querying of Big Data", In Publication of Wiley Online Library, Jun. 1, 2013, 4 pages.

Jerzy Neyman, "Outline of a theory of statistical estimation based on the classical theory of probability", In Publication of Royal Society, Aug. 30, 1937, 48 pages.

North, Chris, "Toward measuring visualization insight", In Journal of IEEE Computer Graphics and Applications, vol. 26, Issue 3, May 1, 2006, pp. 20-23.

"Airline Delays, Cancellations and Tarmac Times", http://www.rita.dot.gov/bts/data_and_statistics/by_mode/airline_and_airports/airline_delay.html, Retrieved on: Dec. 15, 2016, 2 pages.

Olken, et al., "Simple Random Sampling from Relational Databases", In Proceedings of the Twelfth International Conference on Very Large Data Bases, Aug. 1986, pp. 160-169.

Olston, et al., "Visualizing data with bounded uncertainty", In Proceedings of the IEEE Symposium on Information Visualization, Oct. 28, 2002, pp. 1-8.

(56) References Cited

OTHER PUBLICATIONS

Perrot, et al., "Large interactive visualization of density functions on big data", In Proceedings of 5th IEEE Symposium on Large Data Analysis and Visualization, Oct. 2015, 9 pages.

Pezzotti, et al., "Approximated and User Steerable tSNE for Progressive Visual Analytics", In Journal of IEEE Transactions on Visualization and Computer Graphics, Dec. 2015, pp. 1-15.

Pirolli, et al., "The sensemaking process and leverage points for analyst technology as identified through cognitive task analysis", In Proceedings of international conference on intelligence analysis, vol. 5, May 2, 2005, 6 pages.

Stasko, et al., "Jigsaw: supporting investigative analysis through interactive visualization", In Journal of Information Visualization, vol. 7, Issue 2, Summer, 2008, pp. 118-132.

Stolper, et al., "Progressive visual analytics: User-driven visual exploration of in-progress analytics", In Journal of IEEE transactions on visualization and computer graphics, vol. 20, Issue 12, Dec. 31, 2014, 10 pages.

Stolte, et al., "Polaris: A system for query, analysis, and visualization of multidimensional relational databases", In Journal of IEEE Transactions on Visualization and Computer Graphics, vol. 8, Issue 1, Jan. 2002, 10 pages.

Tukey, John W., "Exploratory data analysis", In Publication of Pearsonl, Jan. 1977, pp. 5-23.

Wickham, Hadley, "Bin-summarise-smooth: A framework for visualising large data", In technical Report of Clarkson University, Oct. 13, 2013, 9 pages.

Wickham, et al., "40 years of boxplots", http://vita.had.co.nz/papers/boxplots.pdf, Published on: Nov. 29, 2011, pp. 1-17.

Wongsuphasawat, et al., "Voyager: Exploratory Analysis via Faceted Browsing of Visualization Recommendations", In Journal of IEEE Transactions on Visualization and Computer Graphics, vol. 22, Issue 1, Jan. 2016, 10 pages.

* cited by examiner

DIFFERENCE VISUALIZATION BETWEEN DATA SETS

TECHNICAL FIELD

The subject matter disclosed herein generally relates to machines configured to the technical field of special-purpose machines that facilitate data visualization, including computerized variants of such special-purpose machines and improvements to such variants, and to the technologies by which such special-purpose machines become improved compared to other special-purpose machines that facilitate data visualization. Specifically, the present disclosure addresses systems and methods that provide difference visualization between data sets.

BACKGROUND

Data populating a visual representation, referred to as a visualization or graph, may change. Conventionally, changes to the data result in a new visualization. Alternatively, animation may be used to illustrate the change from a previous state (e.g., comprising a first data set) to a new state (e.g., comprising a second data set). However, these conventional solutions do not emphasize differences between states.

BRIEF DESCRIPTION OF THE DRAWINGS

Some embodiments are illustrated by way of example and not limitation in figures of the accompanying drawings.

DETAILED DESCRIPTION

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example methods (e.g., algorithms) and systems (e.g., special-purpose machines) facilitate visualization of difference between two data sets. In particular, example embodiments provide mechanisms and logic that generate one or more graphs that illustrates differences between a first data set and a second data set. Accordingly, the mechanisms and logic of example visualization systems and methods determines a first data set and a second data set, and determines differences between the first data set and the second data set. The mechanisms and logic then plot a value for each unit of display (e.g., category or subject along an axis of a graph) of the second data set on at least one graph. For each unit of display of the second data set, a determination is made as to whether the first data set has a value for the unit of display. In response to the first data set having the value for the unit of display, a difference of the value of the first data set is plotted on the at least one graph. Alternatively, in response to the first data set not having the value for the unit of display, a missing structure element is plotted on the at least one graph. The mechanism and logic then causes display of a visualization comprising the at least one graph.

As a result, one or more of the methodologies described herein facilitate solving the technical problem of providing visualization of differences between data sets. As such, one or more of the methodologies described herein may obviate a need for certain efforts or resources that otherwise would be involved in users having to maintain and access multiple graphs that illustrate only the data sets in order to identify any differences between the multiple graphs. As a result, resources used by one or more machines, databases, or devices (e.g., within the environment) may be reduced. Examples of such computing resources include processor cycles, network traffic, memory usage, data storage capacity, power consumption, network bandwidth, and cooling capacity.

Figure 1:
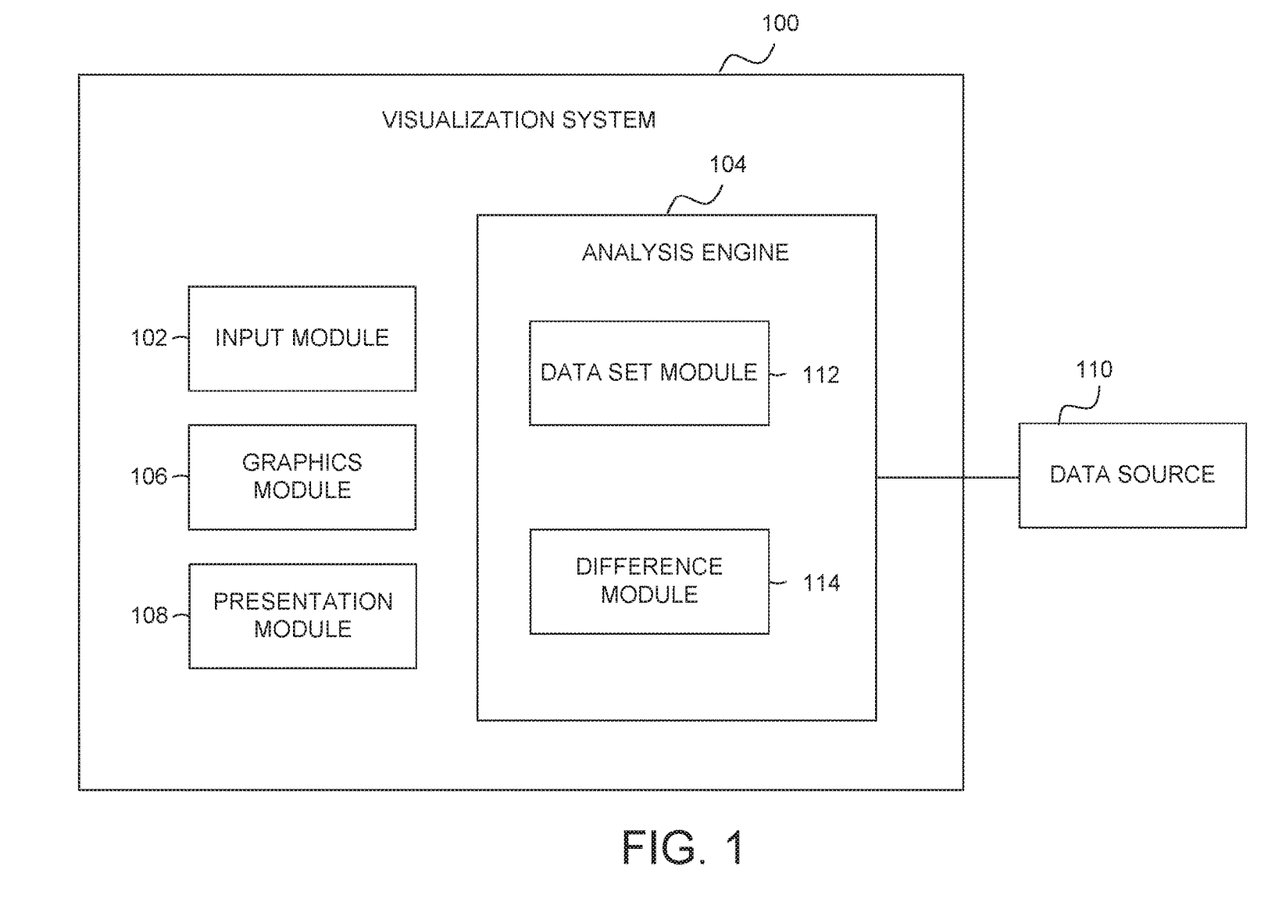
FIG. 1 is a block diagram illustrating components of a visualization system suitable for visualizing differences between data sets, according to some example embodiments.

FIG. 1 is a block diagram illustrating components of a visualization system 100 suitable for visualizing differences between data sets, according to some example embodiments. In some embodiments, the visualization system 100 comprises one or more servers configured to determine data sets, differences between the data sets, and plotting of elements representing values of the data sets and the differences (e.g., generating visualizations). The one or more servers may be networked (e.g., via an intranet or Internet) to one or more client devices. Alternatively, the visualization system 100 may comprise a client device (e.g., a computer, laptop, smartphone, or tablet) operating independently as a stand-alone device or coupled to a network. The visualization system 100 includes an input module 102, an analysis engine 104, a graphics module 106, and a presentation module 108 all communicatively coupled together via a bus, shared memory, or a switch). The visualization system 100 may also comprise or be coupled to one or more data sources 110 that provide input data to the visualization system for analysis.

In example embodiments, the input module 102 receives inputs (e.g., via a client device) that triggers the analysis engine 104 to determine at least a first data set and a second data set. These inputs may comprise one or more of, for example, a query, filters, and graph parameters. The input module 102 may also receive inputs that manipulate a visualization of data set values and/or differences. For example, the input may zoom in on a particular portion of a graph or visualization or select a graphical element for further details (as will be discussed further below).

In example embodiments, the analysis engine 104 determines the data sets for the visualizations and also determines differences between the data sets. Accordingly, the analysis engine 104 comprises a data set module 112 and a difference module 114, each of which is configured to communicate with each other (e.g., via a bus, shared memory, or a switch) and with other components of the visualization system 100. In example embodiments, the analysis engine 104 receives or retrieves information (e.g., from the data source 110) to determine the data sets.

The data set module 112 is configured to determine data sets that will be used in generating the visualizations. The determining of the data sets may comprise any one or more of retrieving, obtaining, receiving, or calculating values in the data sets. In some embodiments, a first data set and a second data set are determined by the data set module 112, whereby the first data set comprises approximate values and the second data set comprises actual values. In these embodiments, a query is received by the input module that triggers analysis of the same input data from the data source 110. In some cases, two rounds of the query are performed. A first round performs an approximation, while a second round obtains actual results. For example, by using approximate query processing (AQP), a sampling of a dataset is used to determine approximate values quickly and with reduced latency (e.g., big data processing), while more precise or actual results may be computed in background.

In alternative embodiments, the first data set is based on previous input data from the data source 110 and the second data set is based on current input data from the data source 110. For example, the previous input data comprises input data from yesterday e.g., yesterday's quantity or prices) and the current input data comprises input data from today (e.g., today's quantity or prices). While example embodiments are discussed whereby the input data is previous and current input data, it is noted that any two sets of data may be used (e.g., input data from a first time period and input data from a second time period). Data sets that are comparable or share some correlation are more likely to result in a more meaningful comparison of the two data sets.

The difference module 114 is configured to determine or identify a difference between the first data set and the second data set. In example embodiments, the difference module 114 determines a change between a value of the first data set and the second data set for a same unit of display (e.g., category or subject along an axis of a graph), an addition of a value for a unit of display in the second data set that is not present in the first data set (e.g., the first data set does not have a value for the same unit of display), and/or a removal of a value of a unit of display in the second data that was present in the first data set. For example, for each unit of display of the second data set, the difference module 114 determines if a value exists in the first data set. If a value does exist, the difference module 114 identifies the difference. In a value does not exist, then the difference module 114 notes the missing value. Additionally, the difference module 114 may, for each unit of display of the first data set, determine if a value exists in the second data set in order to identify any removal of value of unit of displays in the second data set.

The graphics module 106 is configured to plot or render (e.g., position on a graph) elements representing values from the data sets (e.g., the first data set or the second data set), differences of the values between the first data set and the second data set, or missing structure elements. The missing structure element may comprise an element (e.g., a hashed or striped block or column, an X-ed out block, or any other element having a visually distinguishable attribute) that indicates a value (or existence of a value) for a unit of display in the second data set that is not present in the first data set, By illustrating the missing structure element, a user can easily identify a unit of display that was missing from the first data set. In some embodiments, the difference of the value may be illustrated as an element corresponding to an approximation error. In other embodiments, the difference of the value may be illustrated as an element (e.g., a line, block, or point) that corresponds to a value of the first data set shown superimposed over an element representing the corresponding value of the second data set.

One or more graphs are generated by the graphics module 106 that illustrate the values of the second data set along with the differences between the first data set and the second data set. In some embodiments, a first graph is generated (e.g., plotted or rendered) by the graphics module 106 illustrating the values of the second data set and a second graph is generated by the graphics module 106 illustrating the differences of the values of the first data set from the values of the second data set. In other embodiments, a first graph is generated illustrating the values of the second data set and a second graph is generated illustrating the missing structure elements. In yet further embodiments, a first graph is generated illustrating the values of the second data set and a second graph is generated illustrating the difference of the value of the first data set and the values of the second data set along with the missing structure elements. Alternatively, the graphics module 106 generates a single graph illustrating the plotted values of the second data set, the difference of the value of the first data set and the values of the second data set, and the missing structure elements. Any combination of one or more graphs may be used to illustrate the values of the second data set along with the differences determined between the first data set and the second data set (e.g., different values, missing structure elements).

The graphics module 106 may also generate a graph (e.g., a first data set graph) that illustrates the values of the first data set. In embodiments where the first data set graph is presented to a user, the first data set graph illustrates values of the first data set using a different visual effect than values of the second data set illustrated on a subsequent graph. For example, different shades of a color scheme may be used to illustrate the values (e.g., values on the first data set graph are shown in shades of orange while values of the second data set are shown in shades blue), whereby the shades the color scheme correspond to values along a range of values.

The presentation module 108 is configured to cause display of the generated graphs. In some embodiments, the presentation module 108 causes each graph to be displayed on a screen of a device that includes or is coupled to the visualization system. In other embodiments, the presentation module 108 transmits instructions to a networked device that causes the networked device to display the graph.

It is noted that visualization system 100 shown in FIG. 1 is merely an example. Any of the components (e.g., modules, engines, data source) shown in FIG. 1 may be, include, or otherwise be implemented in a special-purpose specialized or otherwise non-generic) computer that has been modified (e.g., configured or programmed by software, such as one or more software modules of an application, operating system, firmware, middleware, or other program) to perform one or more of the functions described herein for that component, system, or machine. For example, a special-purpose computer system able to implement any one or more of the methodologies described herein is discussed below with respect to FIG. 5, and such a special-purpose computer may, accordingly, be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Any one or more of the components (e.g., modules or engines) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component (e.g., module or engine) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices.

Figure 2:
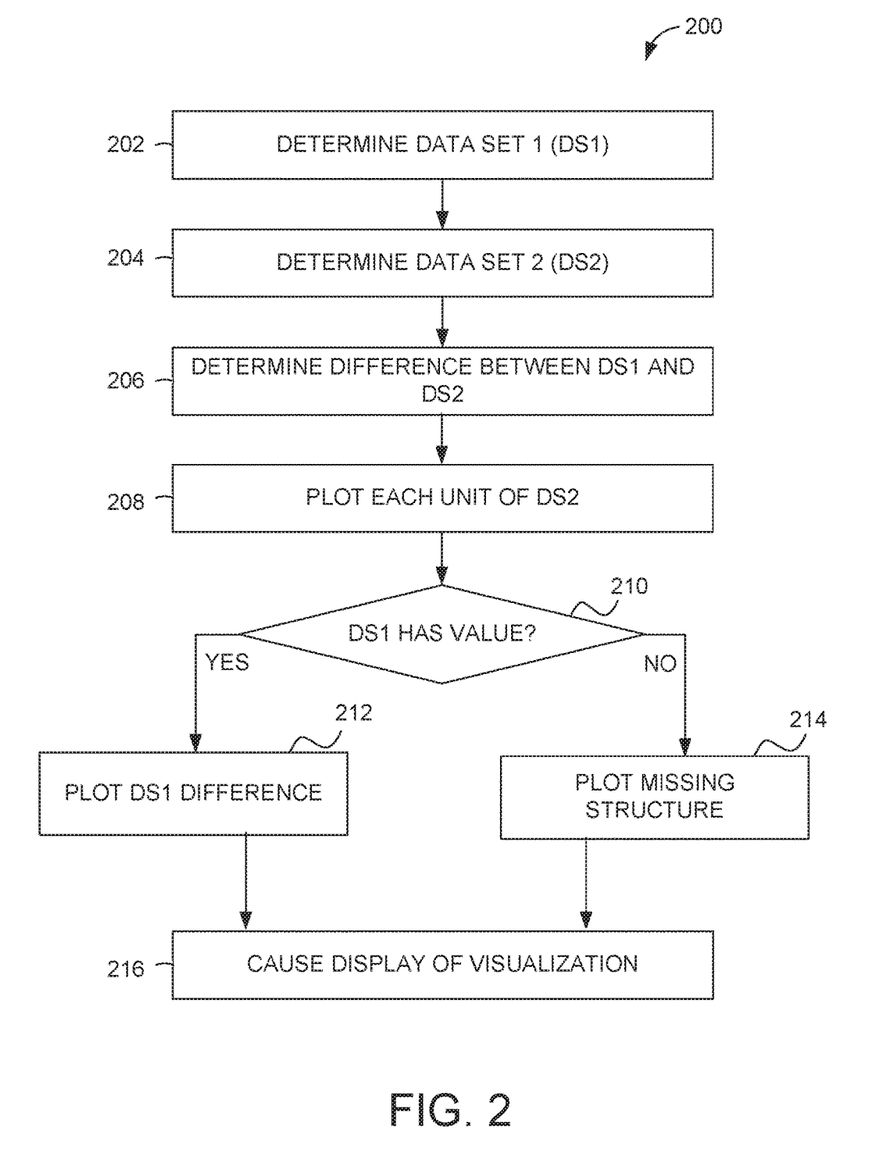
FIG. 2 is a flowchart illustrating operations of a method for visualizing differences between data sets, according to some example embodiments.

FIG. 2 is a flowchart illustrating operations of a method 200 for visualizing differences between data sets, according to some example embodiments. Operations in the method 200 may be performed by the visualization system 100, using components (e.g., modules, engines) described above with respect to FIG. 1. Accordingly, the method 200 is described by way of example with reference to the visualization system 100. However, it shall be appreciated that at least some of the operations of the method 200 may be deployed on various other hardware configurations or he performed by similar components residing elsewhere. Therefore, the method 200 is not intended to be limited to the visualization system 100. The method 200 assumes that one or more inputs is received by the input module 102 that triggers the visualization system 100 to initiate the visualization process.

In operation 202, a first data set is determined by the data set module 112. In example embodiments, the data set module 112 takes the query received by the input module 102 including any filters and performs an analysis on input data. In some embodiments, the first data set comprises approximate values determined from received or accessed input data (e.g., from the data source 110). In alternative embodiments, the first data set is based on accessed or received input data from a particular period of time (e.g., input data from yesterday or last week).

In operation 204, a second data set is determined by the data set module 112. In some embodiments, the second data set comprises actual values determined from received or accessed data (e.g., from the data source 110). For example, two rounds of the query or analysis are performed by the data set module 112. A first round performs an approximation in operation 202, while a second round obtains actual results in operation 204.

In alternative embodiments, the second data set is based on accessed or received input data from a different particular period of time (e.g., input data from today). In these embodiments, operation 202 determined the first data set using first input data. (e.g., input data from a previous time period), while operation 204 determines the second data set using second input data (e.g., input data from a current time period). While example embodiments are discussed whereby the input data is previous and current input data, it is noted that any two sets of data may be used as long as the sets of data are comparable.

In operation 206, a difference between the first data set and the second data set is determined by the difference module 114. In example embodiments, the difference module 114 determines a change between the value of the first data set and the second data set for a same unit of display, an addition of a value for a unit of display in the second data set that is not present in the first data set, and/or a removal of the value of a unit of display in the second data that was present in the first data set.

In operation 208, the graphics module 106 plots (e.g., render) elements representing values from the second data sets. For example, the graphics module 106 may construct a bar graph whereby each unit of display is shown along an x-axis and a value indicated along a y-axis (e.g., see FIG. 3B).

In operation 210, a determination is made as to whether, for each unit of display of the second data set, the first data set has a value for the unit of display. If the first data set has the value for the unit of display, then a difference in the value between the first data set and the second data set is plotted in operation 212. For example, if a value is present for the unit of display (e.g., category of subject in both the first data set and second data set), then an element (e.g., a line, point, or a block) is plotted that shows the value of the first data set in comparison to the value in the second data set for that particular unit of display. In some embodiments, the difference of the value may be illustrated as an element corresponding to an approximation error.

If, in operation 210, the first data set does not have a value for the unit of display present in the second data set, then in operation 214, a missing structure element is plotted by the graphics module 106. The missing structure element comprises an element (e.g., a hashed or striped block or column) that indicates a value (or existence of a value) for the unit of display present in the second data set that is missing from the first data set. The graphics module 106 and operations 208-214 will be discussed in more detail in connection with FIG. 3A to FIG. 4C.

In operation 216, one or more graphs or visualizations are displayed to the user. In some embodiments, the presentation module 108 causes the one or more graphs to be displayed on a screen of a device that includes or is coupled to the visualization system 100. In other embodiments, the presentation module 108 transmits instructions to a networked device (e.g., client device of a user) that causes the networked device to display the one or more graphs.

Figure 3A:
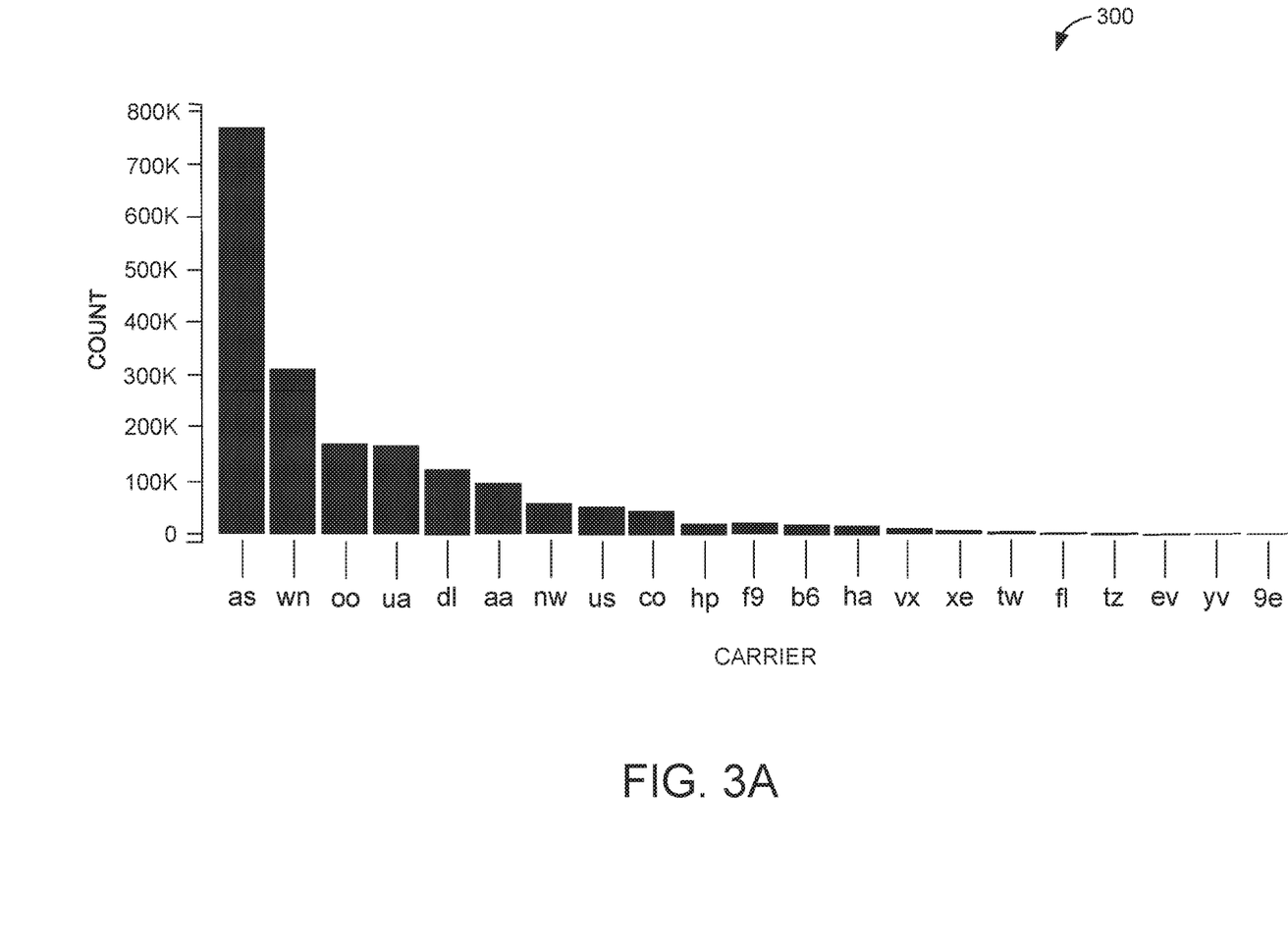
FIG. 3A is an example of a first data set graph.

FIG. 3A is an example of a first data set graph 300. In the example of FIG. 3A, the first data set graph 300 is based on a first data set of approximate values. As shown, the first data set graph 300 is an approximate bar chart for count of flights out of Washington state, grouped by airlines (e.g., carriers). Thus, the unit of display along the x-axis in FIG. 3A are various carriers or airlines. Accordingly, a query is received, by the input module 102 requesting information for count of flights out of Washington state by airline. In example embodiments, the first data set graph 300 illustrates values of the first data set (e.g., count) using a different visual effect (e.g., different shades of a color scheme, such as, shades of orange) than values of the second data set illustrated on a subsequent graph.

Figure 3B:
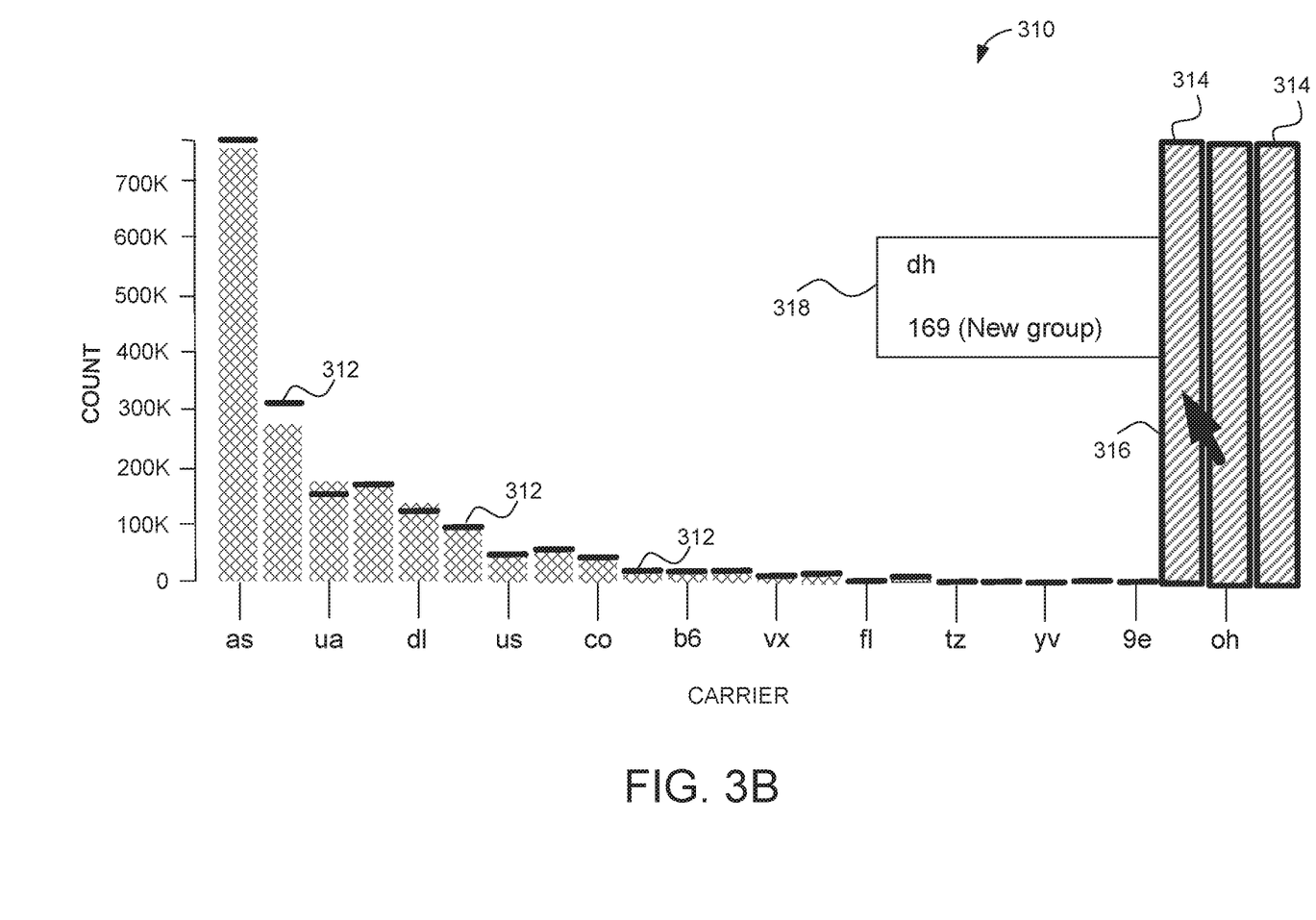
FIG. 3B is an example graph illustrating values of a second data set and differences from a first data set.

FIG. 3B is an example graph 310 illustrating values of a second data set and differences determined between the first data set and the second data set. In the example of FIG. 3B, the second data set comprises actual (or exact) values from a same query using the same input data as that used to generate the first data set graph 300. As such, the graph 310 shown in FIG. 39 is essentially the same as the first data set graph 300 of FIG. 3A (e.g., having a same unit of display type (i.e., carrier) along the x-axis) only with actual values (e.g., count) for each unit of display (e.g., specific carrier). In example embodiments, the actual results are shown with a different visual effect than the values of the first data set graph 300 (e.g., in a different shade of a color scheme, such as, shades of blue). The graph 310 also shows the differences for the approximate values of the first data set using distinguishable visual elements. For example, the approximate value is shown as a line 312 on, along, or associated with a bar representing a corresponding value of the second data set for the same unit of display. In some embodiments, the line is shown using the same color scheme used in the first data set graph 300 (e.g., orange).

Further still, values for units of display of the second data set that are missing from the first data set are shown using a missing structure element 314 (e.g., diagonal striped column or block). As such, the missing structure element 314 highlights when a value for a new unit of display appears in the second data set. For example, a new unit of display corresponding to Independence Air (i.e., "dh") has a value in the second data set, but does not have a value in the first data set. Selection of the missing structure element 314 (e.g., selection by a cursor 316) provides more details regarding the value of the second data set. For example, details element 318 indicates that 169 flights on Independence Air (i.e., "dh") were missing from the approximation (e.g., from the first data set) that were identified in the second data set.

Figure 4A:
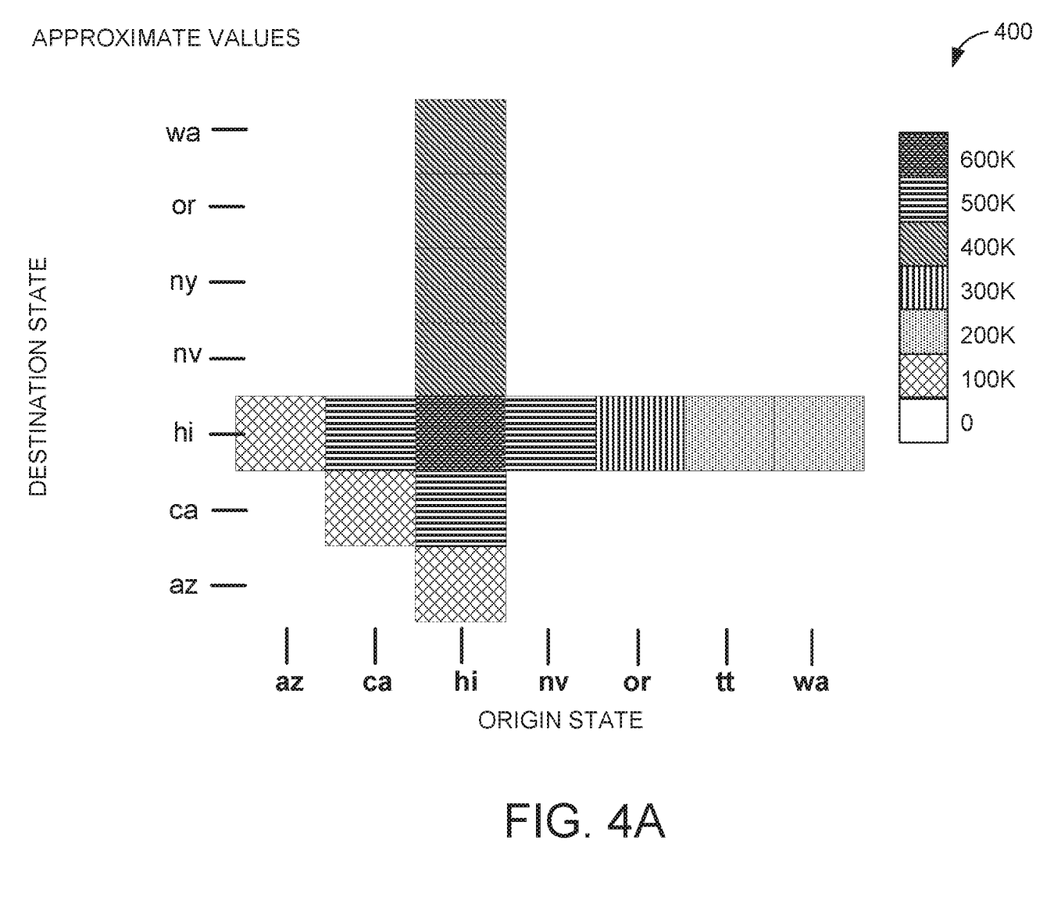
FIG. 4A is an alternative example of a first data set graph.

FIG. 4A is an alternative example of a first data set graph 400 shown as a heatmap. In the example of FIG. 4A, a filter is received by the input module 102 that filters on flights by Hawaiian Airlines by origin and destination states. The first data set graph 400 is an approximation view that shows estimated counts between different units of display (e.g., origin and destination states).

Figure 4B:
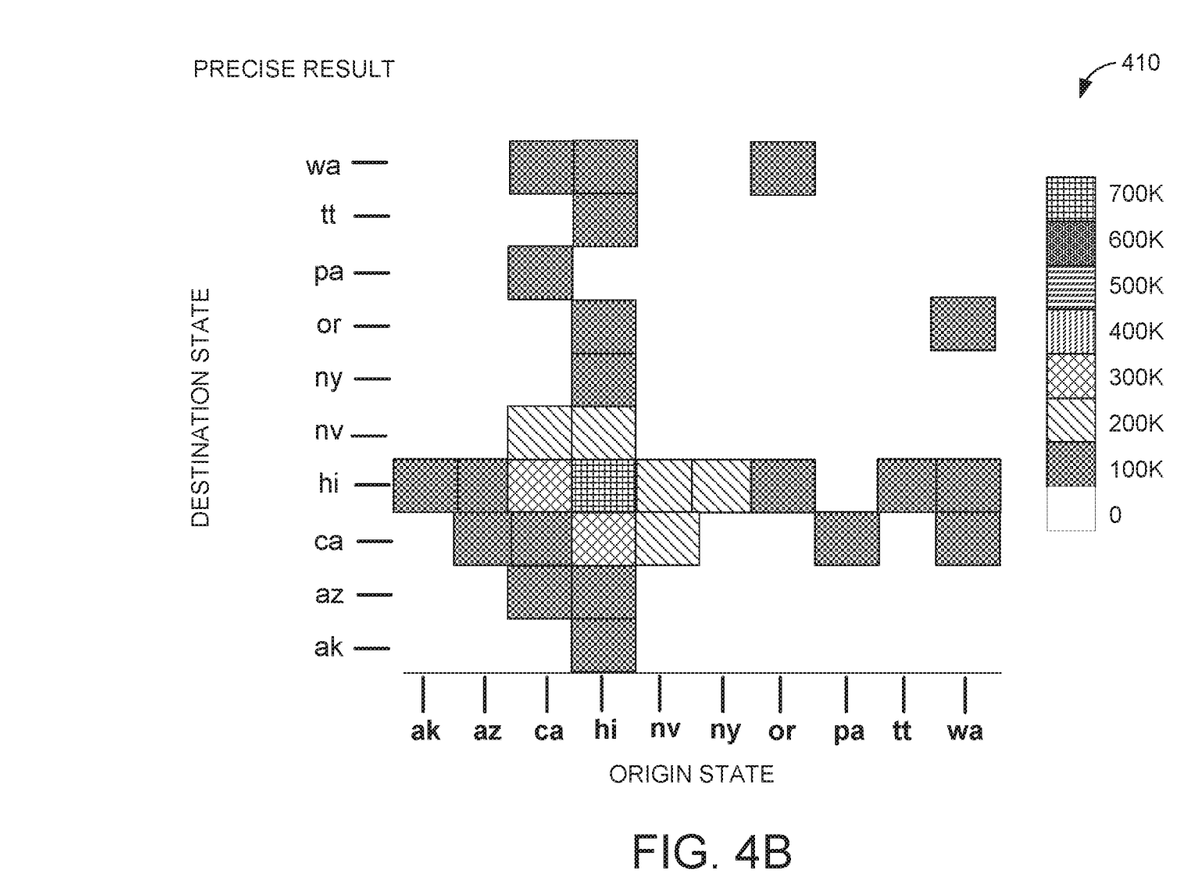
FIG. 4B is an example graph illustrating values of a second data set.

FIG. 4B is an example graph 410 illustrating values of a second data set. The graph 410 is a precise view comprising actual (or exact values). In example embodiments, the graph 410 illustrates values of the second data set using a different visual effect (e.g., different shades of a color scheme, such as, shades of blue) than values of the first data set illustrated on the first data set graph 400.

Figure 4C:
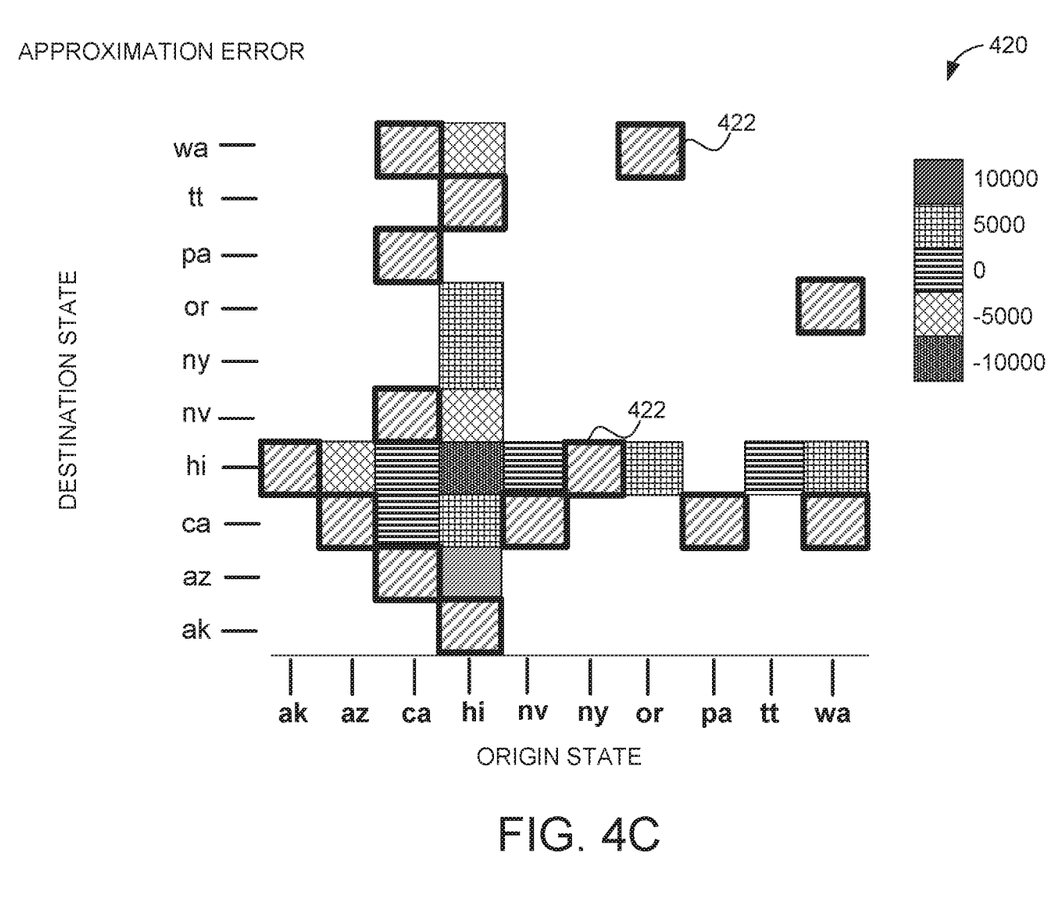
FIG. 4C is an example graph illustrating differences between the first data set and the second data set.

FIG. 4C is an example graph 420 illustrating differences between the first data set and the second data set (e.g., approximation errors). In some embodiments, FIG. 4B and FIG. 4C may be shown together as a final result visualization pair. Any value for a new unit of display (e.g., a new combination of an origin and destination) found in the second data set that is missing from the first data set are visually distinguished using a missing structure element (e.g., diagonal striped block) 422.

While the example graphs of FIGS. 3 and 4 are discussed as plotting approximate values and actual values, example embodiments are not so limited. For example, the first data set may comprise input data from a first period of time, while the second data set comprises input data from a second period of time.

According to various example embodiments, one or more of the methodologies described herein may facilitate providing visualization of differences between data sets. In particular, one or more of the methodologies described herein may constitute all or part of a method (e.g., a method implemented using a machine) that providing visualization of differences between data sets, which reduces efforts or resources that otherwise would be involved in users having to maintain and access multiple graphs that illustrate only the data sets in order to identify any differences between the multiple graphs. When these effects are considered in aggregate, one or more of the methodologies described herein may obviate a need for certain efforts or resources that otherwise would be involved. Examples of such computing resources include processor cycles, network traffic, memory usage, data storage capacity, power consumption, and cooling capacity.

Figure 5:
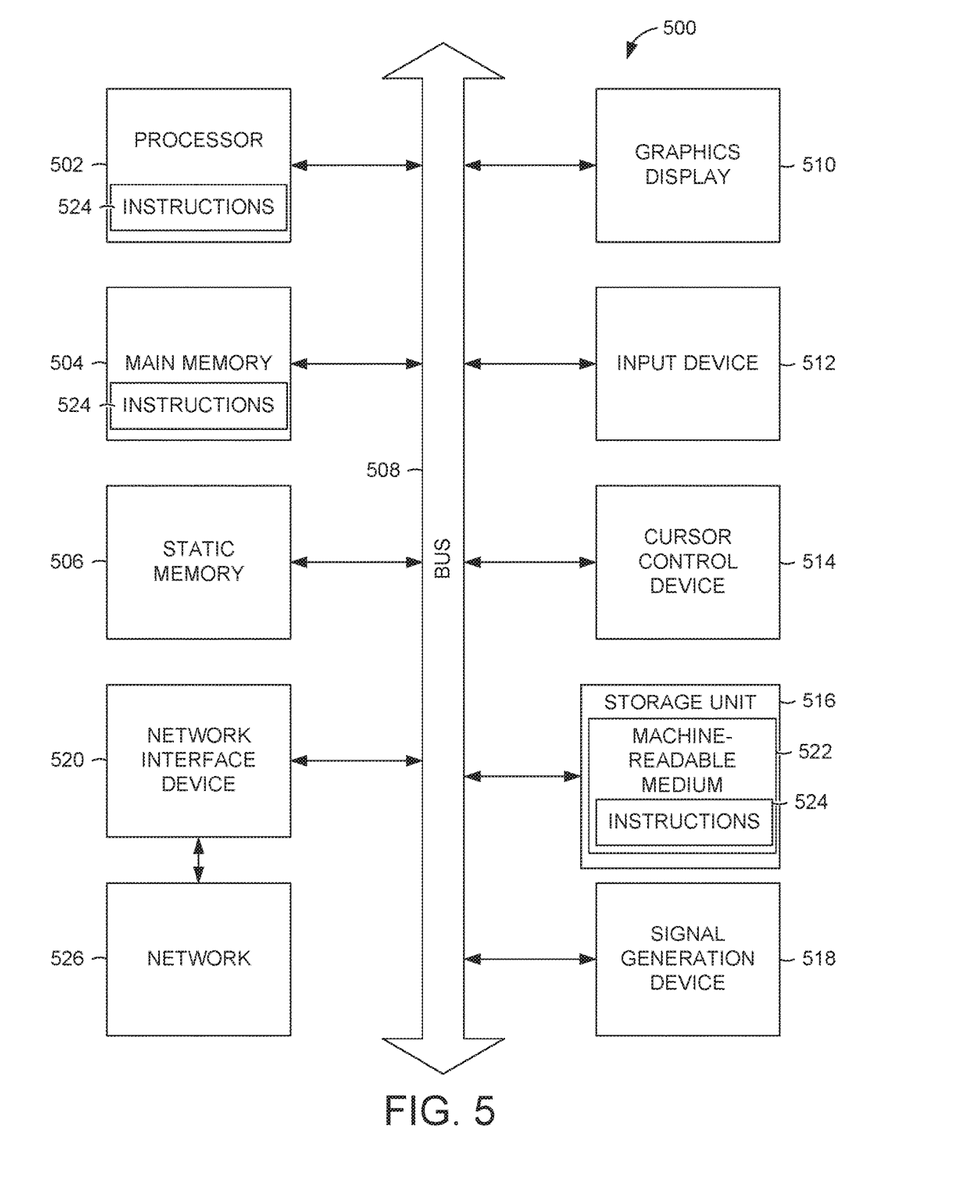
FIG. 5 is a block diagram illustrating components of a machine, according to some example embodiments, able to read instructions from a machine-readable medium and perform any one or more of the methodologies discussed herein.

FIG. 5 illustrates components of a machine 500, according to some example embodiments, that is able to read instructions from a machine-readable medium (e.g., a machine-readable storage device, a non-transitory machine-readable storage medium, a computer-readable storage medium, or any suitable combination thereof) and perform any one or more of the methodologies discussed herein. Specifically, FIG. 5 shows a diagrammatic representation of the machine 500 in the example form of a computer device (e.g., a computer) and within which instructions 524 (e.g., software, a program, an application, an applet, an app, or other executable code) for causing the machine 500 to perform any one or more of the methodologies discussed herein may be executed, in whole or in part.

For example, the instructions 524 may cause the machine 500 to execute the flow diagrams of FIG. 2. In one embodiment, the instructions 524 can transform the general, non-programmed machine 500 into a particular machine (e.g., specially configured machine) programmed to carry out the described and illustrated functions in the manner described.

In alternative embodiments, the machine 500 operates as a standalone device or may be connected (e.g., networked) to other machines. In a networked deployment, the machine 500 may operate in the capacity of a server machine or a client machine in a server-client network environment, or as a peer machine in a peer-to-peer (or distributed) network environment. The machine 500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 524 (sequentially or otherwise) that specify actions to be taken by that machine. Further, while only a single machine is illustrated, the term "machine" shall also be taken to include a collection of machines that individually or jointly execute the instructions 524 to perform any one or more of the methodologies discussed herein.

The machine 500 includes a processor 502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 504, and a static memory 506, which are configured to communicate with each other via a bus 508. The processor 502 may contain microcircuits that are configurable, temporarily or permanently, by some or all of the instructions 524 such that the processor 502 is configurable to perform any one or more of the methodologies described herein, in whole or in part. For example, a set of one or more microcircuits of the processor 502 may be configurable to execute one or more modules (e.g., software modules) described herein.

The machine 500 may further include a graphics display 510 (e.g., a plasma display panel (PDP), a light emitting diode (LED) display, a liquid crystal display (LCD), a projector, or a cathode ray tube (CRT), or any other display capable of displaying graphics or video). The machine 500 may also include an alphanumeric input device 512 (e.g., a keyboard), a cursor control device 514 (e.g., a mouse, a touchpad, a trackball, a joystick, a motion sensor, or other pointing instrument), a storage unit 516, a signal generation device 518 (e.g., a sound card, an amplifier, a speaker, a headphone jack, or any suitable combination thereof), and a network interface device 520.

The storage unit 516 includes a machine-readable medium 522 (e.g., a tangible machine-readable storage medium) on which is stored the instructions 524 (e.g., software) embodying any one or more of the methodologies or functions described herein. The instructions 524 may also reside, completely or at least partially, within the main memory 504, within the processor 502 (e.g., within the processor's cache memory), or both, before or during execution thereof by the machine 500. Accordingly, the main memory 504 and the processor 502 may be considered as machine-readable media (e.g., tangible and non-transitory machine-readable media). The instructions 524 may be transmitted or received over a network 526 via the network interface device 520.

In some example embodiments, the machine 500 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 522 able to store data temporarily or permanently and may be taken to include, but not be limited to, random-access memory (RAM), read-only memory (ROM), buffer memory, flash memory, and cache memory. While the machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium, or combination of multiple media, that is capable of storing instructions (e.g., software) for execution by the machine (e.g., machine 500), such that the instructions, when executed by one or more processors of the machine (e.g., processor 502), cause the machine to perform any one or more of the methodologies described herein. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. In some embodiments, a "machine-readable medium" may also be referred to as a "machine-readable storage device" or a "hardware storage device."

Furthermore, the machine-readable medium 522 is non-transitory in that it does not embody a propagating or transitory signal except in jurisdictions where such signals are eligible for protection. However, labeling the machine-readable medium 522 as "non-transitory" should not be construed to mean that the medium is incapable of movement—the medium should be considered as being transportable from one physical location to another. Additionally, since the machine-readable medium 522 is tangible, the medium may be considered to be a tangible machine-readable storage device.

In some example embodiments, the instructions 524 for execution by the machine 500 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 524)

The instructions 524 may further be transmitted or received over a communications network 526 using a transmission medium via the network interface device 520 and utilizing any one of a number of well-known transfer protocols e.g., HTTP). Examples of communication networks 526 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 524 for execution by the machine 500, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner.

In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

EXAMPLES

Example 1 is a method for visualizing differences between data sets. The method comprises determining a first data set and a second data set; determining a difference between the first data set and the second data set; plotting, by a hardware processor, a value corresponding to each unit of display of the second data set on at least one graph; determining, for each unit of display of the second data set, whether the first data set has a value for the unit of display of the second data set; in response to the first data set having the value for the unit of display, plotting a difference of the value of the first data set on the at least one graph; in response to the first data set not having the value for the unit of display, plotting a missing structure element on the at least one graph; and causing display of a visualization comprising the at least one graph.

In example 2, the subject matter of example 1 can optionally include wherein the determining the first data set and the second data set comprises determining approximate values of the first data set; and determining actual values of the second data set.

In example 3, the subject matter of examples 1-2 can optionally include wherein the determining the first data set and the second data set comprises determining values of the first data set using input data from a first time period; and determining values of the second data set using input data from a second time period.

In example 4, the subject matter of examples 1-3 can optionally include wherein the causing the display comprises causing display of a first graph illustrating the plotted values of the second data set and a second graph illustrating the difference of the value of the first data set.

In example 5, the subject matter of examples 1-4 can optionally include wherein the causing the display comprises causing display of a first graph illustrating the plotted values of the second data set and a second graph illustrating the missing structure element.

In example 6, the subject matter of examples 1-5 can optionally include wherein the causing the display comprises causing display of a single graph illustrating the platted values of the second data set, the difference of the value of the first data set, and the missing structure element.

In example 7, the subject matter of examples 1-6 can optionally include plotting each value of the first data set on a first data set graph; and causing display of the first data set graph, the first data set graph illustrating values of the first data set using a different visual effect than values of the second data set illustrated on the at least one graph.

In example 8, the subject matter of examples 1-7 can optionally include wherein the different visual effect comprises a different color scheme.

In example 9, the subject matter of examples 1-8 can optionally include wherein the plotting the difference of the value of the first data set on the at least one graph comprises plotting an element corresponding to an approximation error.

In example 10, the subject matter of examples 1-9 can optionally include wherein the plotting the difference of the value of the first data set on the at least one graph comprises plotting an element corresponding to the value of the first data set.

Example 11 is a system for visualizing differences between data sets. The system includes one or more processors and a storage device storing instructions that, when executed by the one or more hardware processors, causes the one or more hardware processors to perform operations comprising determining a first data set and a second data set; determining a difference between the first data set and the second data set; plotting a value corresponding to each unit of display of the second data set on at least one graph; determining, for each unit of display of the second data set, whether the first data set has a value for the unit of display of the second data set; in response to the first data set having the value for the unit of display, plotting a difference of the value of the first data set on the at least one graph; in response to the first data set not having the value for the unit of display, plotting a missing structure element on the at least one graph; and causing display of a visualization comprising the at least one graph.

In example 12, the subject matter of example 11 can optionally include wherein the causing the display comprises causing display of a first graph illustrating the plotted values of the second data set and a second graph illustrating the difference of the value of the first data set.

In example 13, the subject matter of examples 11-12 can optionally include wherein the causing the display comprises causing display of a first graph illustrating the plotted values of the second data set and a second graph illustrating the missing structure element.

In example 14, the subject matter of examples 11-13 can optionally include wherein the causing the display comprises causing display of a single graph illustrating the plotted values of the second data set, the difference of the value of the first data set, and the missing structure element.

In example 15, the subject matter of examples 11-14 can optionally include wherein the operations further comprise plotting each value of the first data set on a first data set graph; and causing display of the first data set graph, the first data set graph illustrating values of the first data set using a different visual effect than values of the second data set illustrated on the at least one graph In example 16, the subject matter of examples 11-15 can optionally include wherein the plotting of the difference of the value of the first data set comprises plotting an element corresponding to an approximation error or a plotting an element corresponding to the value of the first data set Example 17 is a hardware storage device for visualizing differences between data sets. The hardware storage device configures one or more processors to perform operations comprising determining a first data set and a second data set; determining a difference between the first data set and the second data set; plotting a value corresponding to each unit of display of the second data set on at least one graph; determining, for each unit of display of the second data set, whether the first data set has a value for the unit of display of the second data set; in response to the first data set having the value for the unit of display, plotting a difference of the value of the first data set on the at least one graph; in response to the first data set not having the value for the unit of display, plotting a missing structure element on the at least one graph; and causing display of a visualization comprising the at least one graph.

In example 18, the subject matter of example 17 can optionally include wherein the causing the display comprises causing display of a first graph illustrating the plotted values of the second data set and a second graph illustrating the difference of the value of the first data set.

In example 19, the subject matter of examples 17-18 can optionally include wherein the causing the display comprises causing display of a first graph illustrating the plotted values of the second data set and a second graph illustrating the missing structure element.

In example 20, the subject matter of examples 17-19 can optionally include wherein the causing the display comprises causing display of a single graph illustrating the plotted values of the second data set, the difference of the value of the first data set, and the missing structure element.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method for consolidating multiple graphs corresponding to a first data set and a second data set into a single graph visualizing differences between the first data set and a second data set, the method comprising:
   receiving, by a visualization system from a client device via a network, an input that automatically triggers the visualization system to initiate a visualization process;
   in response to receiving the input, automatically triggering determination of the first data set and the second data set;
   determining, by the visualization system, a difference between the first data set and the second data set;
   rendering, by the visualization system, the single graph for display on a screen of the client device, the rendering comprising:
     plotting, by a hardware processor of the visualization system, an element representing a value corresponding to each unit of display of the second data set on the single graph;
     determining, for each unit of display of the second data set, whether the first data set has a value for the unit of display of the second data set;
     in response to the first data set having the value for the unit of display, plotting an element representing a difference of the value of the first data set on the single graph; and
     in response to the first data set not having the value for the unit of display, plotting a missing structure element on the single graph, selection of the missing structure element causing more details associated with the value of the second data set to be displayed on the screen; and
   causing, by the visualization system, display of a visualization comprising the rendered single graph on the screen of the client device.

2. The method of claim 1, wherein the determination of the first data set and the second data set comprises:
   determining approximate values of the first data set; and
   determining actual values of the second data set.

3. The method of claim 1, wherein the determination of the first data set and the second data set comprises:
   determining values of the first data set using input data from a first time period; and
   determining values of the second data set using input data from a second time period.

4. The method of claim 1, further comprising:
   plotting each value of the first data set on a first data set graph; and
   causing display of the first data set graph, the first data set graph illustrating values of the first data set using a different visual effect than values of the second data set illustrated on the single graph.

5. The method of claim 4, wherein the different visual effect comprises a different color scheme.

6. The method of claim 1, wherein the plotting the element representing the difference of the value of the first data set on the single graph comprises plotting an element corresponding to an approximation error.

7. The method of claim 1, wherein the plotting the element representing the difference of the value of the first data set on the single graph comprises plotting an element corresponding to the value of the first data set.

8. A system for consolidating multiple graphs corresponding to a first data set and a second data set into a single graph visualizing differences between the first data set and a second data set, the system comprising:
   one or more hardware processors; and
   a storage device storing instructions that, when executed by the one or more hardware processors, causes the one or more hardware processors to perform operations comprising:
     receiving, from a client device via a network, an input that automatically triggers the system to initiate a visualization process;
     in response to receiving the input, automatically triggering determination of the first data set and the second data set;
     determining a difference between the first data set and the second data set;
     rendering the single graph for display on a screen of the client device, the rendering comprising:
       plotting a value corresponding to each unit of display of the second data set on the single graph;
       determining, for each unit of display of the second data set, whether the first data set has a value for the unit of display of the second data set;

in response to the first data set having the value for the unit of display, plotting an element representing a difference of the value of the first data set on the single graph; and in response to the first data set not having the value for the unit of display, plotting a missing structure element on the single graph, selection of the missing structure element causing more details associated with the value of the second data set to be displayed on the screen; and causing display of a visualization comprising the rendered single graph on the screen of the client device.

9. The system of claim 8, wherein the plotting the element representing the difference of the value of the first data set comprises plotting an element corresponding to the value of the first data set.

10. The system of claim 8, wherein the operations further comprise:

plotting each value of the first data set on a first data set graph; and causing display of the first data set graph, the first data set graph illustrating values of the first data set using a different visual effect than values of the second data set illustrated on the single graph.

11. The system of claim 8, wherein the plotting of the element representing the difference of the value of the first data set comprises plotting an element corresponding to an approximation error.

12. The system of claim 8, wherein the determination of the first data set and the second data set comprises:

determining approximate values of the first data set; and
determining actual values of the second data set.

13. The system of claim 8, wherein the determination of the first data set and the second data set comprises:

determining values of the first data set using input data from a first time period; and determining values of the second data set using input data from a second time period.

14. A hardware storage device storing instructions for consolidating multiple graphs corresponding to a first data set and a second data set into a single graph visualizing differences between the first data set and a second data set, the instructions, when executed by one or more processors of a machine, cause the machine to perform operations comprising:

receiving, from a client device via a network, an input that automatically triggers a visualization system to initiate a visualization process;

in response to receiving the input, automatically triggering determination of the first data set and the second data set;

determining, by the visualization system, a difference between the first data set and the second data set;

rendering, by the visualization system, the single graph for display on a screen of the client device, the rendering comprising:

plotting, by the visualization system, an element representing a value corresponding to each unit of display of the second data set on the single graph;

determining, by the visualization system for each unit of display of the second data set, whether the first data set has a value for the unit of display of the second data set;

in response to the first data set having the value for the unit of display, plotting, by the visualization system, an element representing a difference of the value of the first data set on the single graph; and in response to the first data set not having the value for the unit of display, plotting, by the visualization system, a missing structure element on the single graph, selection of the missing structure element causing more details associated with the value of the second data set to be displayed on the screen; and causing, by the visualization system, display of a visualization comprising the rendered single graph on the screen of the client device.

15. The hardware storage device of claim 14, wherein the determination of the first data set and the second data set comprises:

determining approximate values of the first data set; and
determining actual values of the second data set.

16. The hardware storage device of claim 14, wherein the determination of the first data set and the second data set comprises:

determining values of the first data set using input data from a first time period; and determining values of the second data set using input data from a second time period.

17. The hardware storage device of claim 14, wherein the plotting the element representing the difference of the value of the first data set comprises plotting an element corresponding to the value of the first data set.

18. The hardware storage device of claim 14, wherein the operations further comprise:

plotting each value of the first data set on a first data set graph; and causing display of the first data set graph, the first data set graph illustrating values of the first data set using a different visual effect than values of the second data set illustrated on the single graph.

19. The hardware storage device of claim 14, wherein the plotting the element representing the difference of the value of the first data set comprises plotting an element corresponding to an approximation error.

* * * * *